(12) United States Patent
Akita et al.

(10) Patent No.: US 7,893,868 B2
(45) Date of Patent: Feb. 22, 2011

(54) RADAR DEVICE

(75) Inventors: Kenichi Akita, Tokyo (JP); Kado Nakagawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/512,126

(22) Filed: Jul. 30, 2009

(65) Prior Publication Data

US 2009/0289831 A1 Nov. 26, 2009

Related U.S. Application Data

(62) Division of application No. 11/677,219, filed on Feb. 21, 2007, now abandoned.

(30) Foreign Application Priority Data

Oct. 27, 2006 (JP) .............................. 2006-292396

(51) Int. Cl.
*G01S 7/40* (2006.01)
*G01S 13/93* (2006.01)

(52) U.S. Cl. .................... 342/192; 342/70; 342/111; 342/159; 342/173

(58) Field of Classification Search ............. 342/70–72, 342/107–108, 110, 115, 132, 145, 158, 159, 342/192, 17–19, 173–174
See application file for complete search history.

(56) References Cited

U.S. PATENT DOCUMENTS

| 3,992,709 | A | | 11/1976 | Watanabe et al. |
| 4,356,489 | A | * | 10/1982 | Hirota et al. .................. 342/71 |
| 6,380,887 | B1 | | 4/2002 | Suen |
| 6,825,799 | B2 | | 11/2004 | Isaji |
| 6,977,609 | B2 | * | 12/2005 | Pleva et al. .................... 342/28 |
| 7,187,321 | B2 | * | 3/2007 | Watanabe et al. ........... 342/173 |
| 7,339,518 | B2 | | 3/2008 | Natsume et al. |
| 7,439,903 | B2 | * | 10/2008 | Watanabe et al. ............. 342/59 |
| 7,567,204 | B2 | * | 7/2009 | Sakamoto ..................... 342/91 |

FOREIGN PATENT DOCUMENTS

| JP | 11-231052 A | 8/1999 |
| JP | 2002-168947 A | 6/2002 |
| JP | 2004-163340 A | 6/2004 |
| JP | 2004-170183 A | 6/2004 |
| JP | 2004-286537 A | 10/2004 |
| JP | 2006-220624 A | 8/2006 |

* cited by examiner

*Primary Examiner*—Thomas H Tarcza
*Assistant Examiner*—Cassi Galt
(74) *Attorney, Agent, or Firm*—Sughrue Mion, PLLC (57) ABSTRACT

A radar device is mounted on a vehicle, for detecting an object, and includes: a transmitting unit for transmitting an electromagnetic wave as a transmitter signal; a receiving unit for receiving a reflected signal that is reflected from the object as a receiver signal; a signal processing unit for measuring a distance and a relative velocity between the vehicle and the object on the basis of a beat signal that is obtained by the transmitter signal and the receiver signal; and an interference detecting unit for detecting the interference signal from another radar device or a communication device on the basis of a signal intensity of the frequency range that is not used for measuring the distance to the object and the relative velocity of the object.

1 Claim, 5 Drawing Sheets

RADAR DEVICE

CROSS REFERENCE TO THE RELATED APPLICATIONS

This application is a Divisional of U.S. patent application Ser. No. 11/677,219 filed Feb. 21, 2007, now abandoned which claims benefit of Japanese Patent Application No. 2006-292396 filed Oct. 27, 2006. The above-noted applications are incorporated herein by reference in their entirety.

BACKGROUND OF THE INVENTION

1. Field of the Invention

The present invention relates to a radar device that is mounted on a vehicle for detecting an object (target) such as a preceding vehicle that exists around an own vehicle and measuring a distance thereof from the own vehicle and a relative velocity of the object with respect to the own vehicle.

2. Description of the Related Art

A radar device installed on an own vehicle transmits an electromagnetic wave as a transmitter signal, receives a reflected signal that is reflected by a target such as a preceding vehicle as a receiver signal, and calculates a distance and a relative velocity between the own vehicle and the target on the basis of a frequency analysis result with respect to a difference between the transmitter signal and the receiver signal. The radar device is used in an obstacle proximity warning system, an inter-vehicle distance control system, or a traffic jam following system.

In the radar device, when a receiver signal that has been reflected by the target and an electromagnetic wave (interference signal) that has been transmitted from another on-vehicle radar or a communication device are received at the same time, there occurs a so-called interference in which a signal intensity in the frequency analysis result largely increases, and a signal intensity for measuring the distance to the target and the relative velocity of the target is buried. In this situation, although there exists the target, it is impossible to measure the distance to the target and the relative velocity of the target, which causes a problem in controlling the vehicle.

Under the above-mentioned circumstances, when the interference occurs, it is necessary to surely detect the interference, and notify or warn a vehicle system side of the deterioration in the performance of the radar device. As the interference detecting method of this type, there is a method of temporarily stopping transmittance of the electromagnetic waves, receiving only the electromagnetic waves (interference signal) which are transmitted from another on-vehicle radar or the communication device, and detecting the presence or absence of the interference signal based on the frequency analysis results of the receiver signal (see, for example, JP 2004-163340 A).

However, in the radar device which is disclosed in JP 2004-163340 A, because the transmission of the electromagnetic waves stops during the interference detecting operation, the measurement of the distance to the target and the relative velocity of the target must be suspended, which is not efficient. Also, when the interference detecting operation is conducted with high frequency in order to enhance the sensitivity of the interference detection, there arises such a problem that a period of time during which the distance to the target and the relative velocity of the target can be measured is reduced.

Also, in the case of scanning with an antenna, there is a method of conducting the interference detecting operation in a specific beam direction, for example, by only an end beam of the antenna scanning.

However, influences of the interference on the respective beams are different depending on the arrival directions of the interference signal. For that reason, there is a case where the interference signal cannot be detected when the interference detecting operation is conducted in only a specific direction.

Also, there is proposed a method of detecting the interference signal based on whether the signal intensity increases or not, since the signal intensity in the frequency analysis results which are obtained by a difference between the transmitter signal and the receiver signal increases when the electromagnetic waves (interference signals) which are transmitted from another radar device or a communication device are received.

However, because there is no distinction between a case where the signal intensity increases due to the receiver signal that is reflected by the target and a case where the signal intensity increases due to the interference signal, the above-mentioned method is not suitable for detecting the interference signal.

SUMMARY OF THE INVENTION

The present invention has been made to solve the above-mentioned problems, and an object of the present invention is to provide a radar device which is cable of detecting an interference signal from the frequency analysis results which are obtained by a difference between a transmitter signal and a receiver signal in all beam directions without stopping the transmission of electromagnetic waves.

According to an aspect of the present invention, there is provided a radar device, which is mounted on a vehicle for detecting an object, including: transmitting means for transmitting an electromagnetic wave as a transmitter signal; receiving means for receiving a reflected signal that is reflected from the object as a receiver signal; signal processing means for measuring a distance and a relative velocity between the vehicle and the object on the basis of a beat signal that is obtained by the transmitter signal and the receiver signal; and interference detecting means for dividing frequencies that are obtained by frequency analysis of the signal processing means into a frequency range that is used for measuring the distance to the object and the relative velocity of the object and a frequency range that is not used for measuring the distance to the object and the relative velocity of the object to detect an interference signal from another radar device or a communication device on the basis of a signal intensity within the frequency range that is not used for measuring the distance to the object and the relative velocity of the object.

According to the present invention, it is possible to detect the interference signal from the frequency analysis results which are obtained by the difference between the transmitter signal and the receiver signal in all beam directions without stopping the transmission of electromagnetic waves. Accordingly, since the interference signal that is caused by the electromagnetic waves which are transmitted from another on-vehicle radar or a communication device can always be monitored, it is possible to detect the interference signal at a high speed.

DETAILED DESCRIPTION OF THE PREFERRED EMBODIMENTS

First Embodiment

Figure 1:
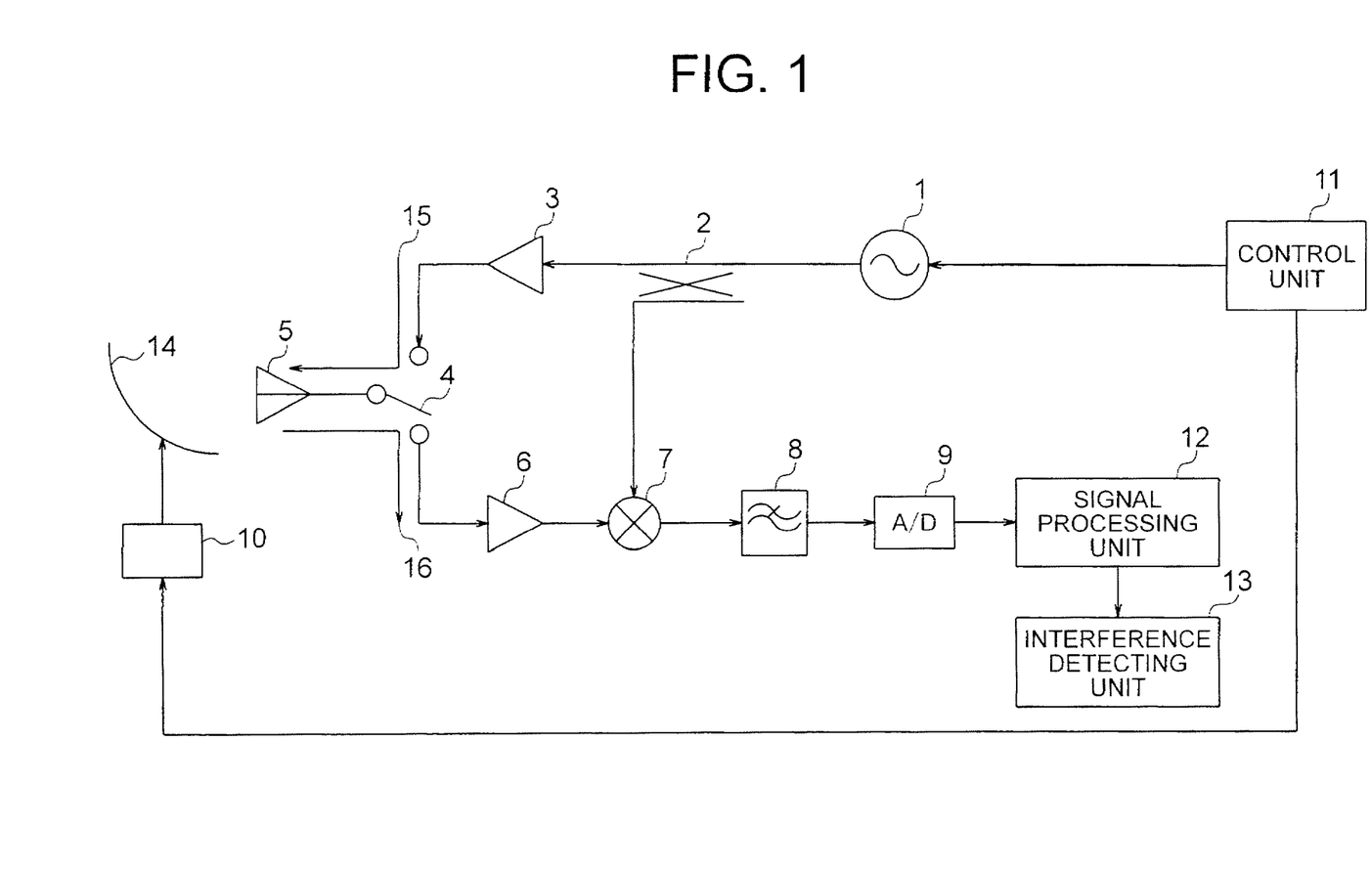
FIG. 1 is a block diagram showing a configuration of a radar device according to the present invention.

FIG. 1 is a block diagram showing a configuration of a radar device according to a first embodiment of the present invention. The radar device shown in FIG. 1 represents a radar device of an FM-pulse Doppler system, and includes, as a transmitter circuit, a voltage control oscillator 1 for generating a signal according to an applied voltage waveform, a directive coupler 2 for supplying the signal that is outputted from the voltage control oscillator 1 to a transceiver circuit, an amplifier 3 for amplifying an output signal of the directive coupler 2, a transmission/reception changeover switch 4 for changing over the transmission/reception of the radar, and a transmission/reception antenna 5 for both of transmission and reception.

Also, the radar device shown in FIG. 1 includes, as a receiver circuit, a low-noise amplifier 6 for amplifying a receiver signal, a mixer 7 for mixing a receiver signal which is an output signal of the low-noise amplifier 6 with a transmitter signal that is transmitted from the directive coupler 2 to take out a beat signal which is a difference in the frequency between the receiver signal and the transmitter signal, a low-pass filter 8 for removing unnecessary high frequency components from the beat signal, and an A/D converter 9 for converting an output signal of the low-pass filter 8 into a digital signal.

Also, the radar device shown in FIG. 1 includes a control unit 11 for controlling the voltage control oscillator 1, the transmit/receive changeover switch 4, and a driving motor 10 for a reflector 14, a signal processing unit (signal processing means) 12 for analyzing a signal that has been converted into the digital signal by the A/D converter 9 to measure a position of the target and a relative velocity of the target according to the frequency spectrum of the frequency analysis results, and an interference detecting unit (interference detecting means) 13 for detecting an interference signal from another radar device or a communication device on the basis of the processing results of the signal processing unit 12. Reference numerals 15 and 16 denote the transmitter signal and the receiver signal, respectively.

Figure 2:
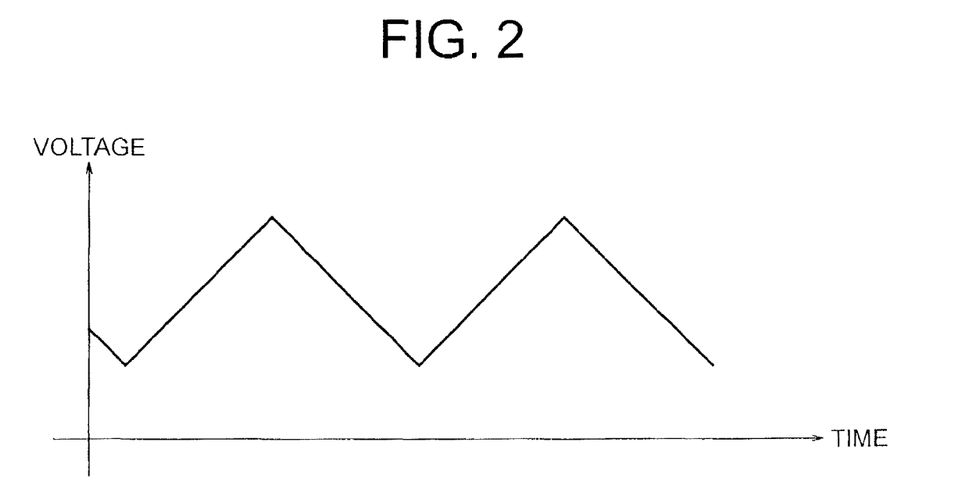
FIG. 2 is an explanatory diagram showing a voltage waveform that is applied to a voltage control oscillator according to the present invention.

First, the transmitting operation of the radar device shown in FIG. 1 will be described with reference to FIG. 2. The control unit 11 supplies a chopping signal shown in FIG. 2 to the voltage control oscillator 1. The voltage control oscillator 1 outputs a continuous wave (FM-CW: frequency-modulated continuous wave) which has been frequency-modulated into a chopping waveform on the basis of a voltage that has been applied from the control unit 11. A signal that has been outputted from the voltage control oscillator 1 is inputted to the directivity coupler 2, and one of the output signals from the directive coupler 2 is amplified by the amplifier 3, and the other output signal is inputted into the mixer 7 as a local signal. The signal that has been amplified by the amplifier 3 is modulated into a pulse by the transmission/reception changeover switch 4 having a changeover timing controlled by the control unit 11, and radiated toward a space from the transmission/reception antenna 5 as the transmitter signal 15.

Subsequently, the receiving operation of the radar device shown in FIG. 1 will be described. The transmission/reception changeover switch 4 changes over to a receiving side when, for example, a pulse width Tg has elapsed since the start of transmission of the transmitter signal 15, and connects the transmission/reception antenna 5 and the low-nose amplifier 6. The transmitter signal 15 that has been modulated into the pulse by the transmission/reception changeover switch 4 and radiated toward the space from the transmission/reception antenna 5 is reflected by the target that exists in front of the radar, and then received by the transmission/reception antenna 5 as the receiver signal 16. The receiver signal 16 that has been received by the transmission/reception antenna 5 is amplified by the low-noise amplifier 6, and then mixed with a local signal (transmitter signal) that is supplied from the directivity coupler 2 by means of the mixer 7. The signal that has been outputted from the mixer 7 becomes a signal (beat signal) having a beat frequency which is a difference in the frequency between the receiver signal and the transmitter signal. Unnecessary frequency components are removed from the beat signal that has been outputted from the mixer 7 by means of the low-pass filter 8. The output signal of the low-pass filter 8 is converted into a digital signal by means of the A/D converter 9, and then is inputted to the signal processing unit (signal processing means) 12.

Figure 3:
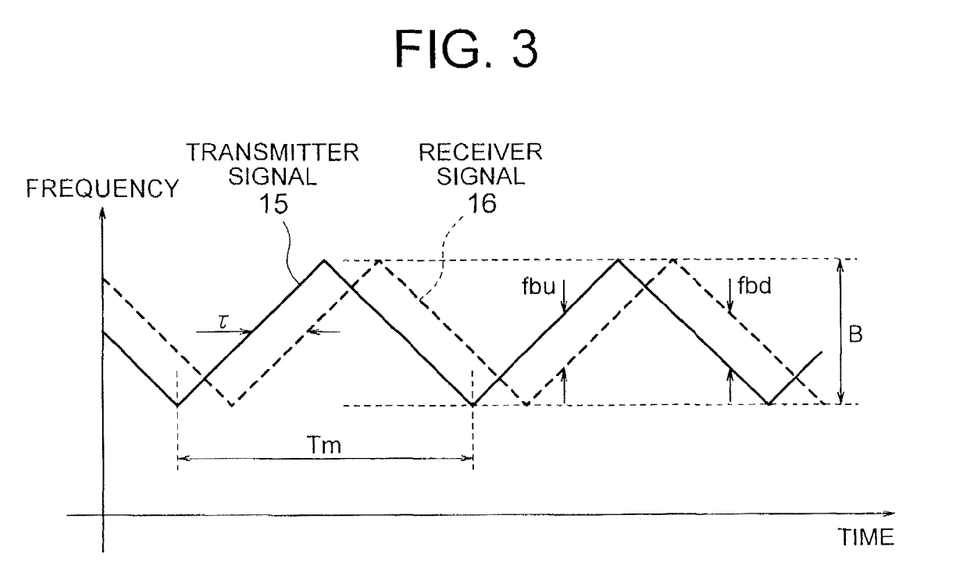
FIG. 3 is an explanatory diagram showing a relationship between a transmitter signal and a receiver signal in the case where a target of a relative velocity 0 is detected in an FM system.
Figure 4:
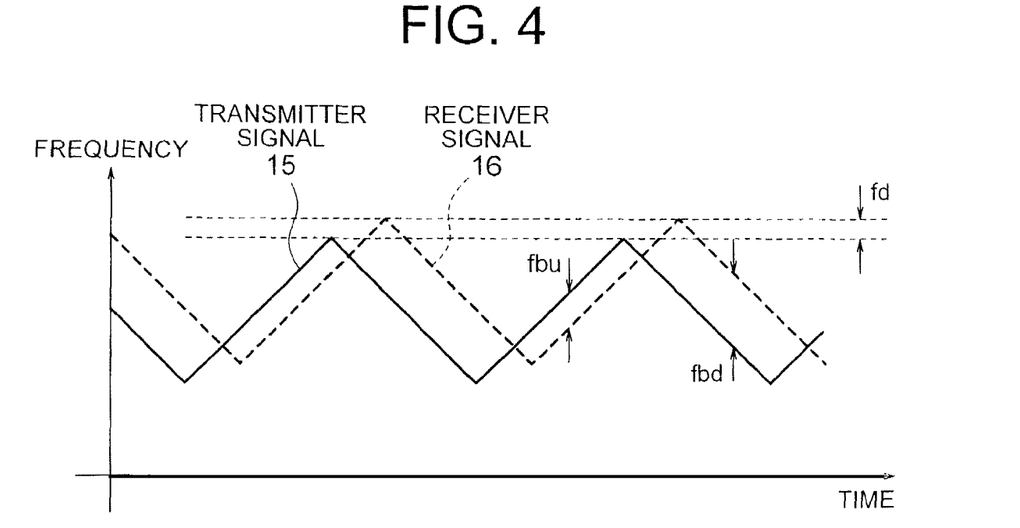
FIG. 4 is an explanatory diagram showing a relationship between the transmitter signal and the receiver signal in the case where the target of a relative velocity V is detected in the FM system.

Subsequently, a description will be given of a method of calculating the target distance and the relative velocity by means of the signal processing unit 12 with reference to FIGS. 3 and 4. FIGS. 3 and 4 show the transmitter signal 15 by a solid line and the receiver signal 16 that has been reflected by the target by a dotted line with the axis of abscissas indicating a time and the axis of ordinate indicating a frequency. The transmitter signal 15 has been frequency-modulated into the chopping waveform in a frequency trace width B (Hz) a modulation cycle Tm (sec).

When the transmitter signal 15 that has been transmitted from the transmission/reception antenna 5 is reflected by the target of the relative velocity 0 which is located at a distance R, the transmitter signal 15 is received by the transmission/ reception antenna 5 after a delay time τ (sec) which is represented by the following expression.

(EX 1)

$$\tau = \frac{2R}{c} \quad (1)$$

where c (m/c) is the velocity of light.

In this case, as shown in FIG. 3, the receiver signal is received with, when the frequency is modulated up, a frequency difference of fbu (Hz) and with, when the frequency is modulated down, a frequency difference of fbd (Hz) with reference to the transmitter signal 15. A difference in the frequency between the transmitter signal 15 and the receiver signal 16 is called "beat frequency". In this example, when the relative velocity of the target is 0 (m/s), the beat frequency fbu (Hz) by which the frequency is modulated up becomes equal to the beat frequency fbd (Hz) by which the frequency is modulated down.

Figure 5:
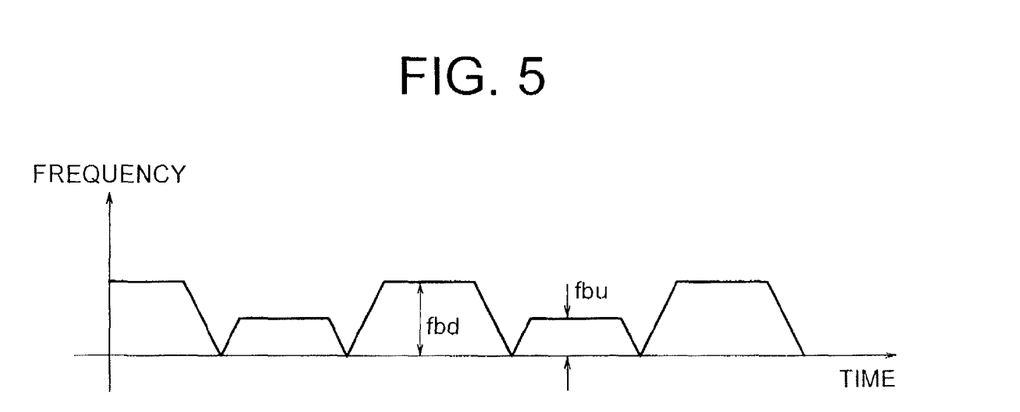
FIG. 5 is an explanatory diagram showing a beat signal which is a difference between the transmitter signal and the receiver signal of FIG. 4.

On the other hand, in the case where the target that is located at a distance R (m) has a relative velocity V (m/s), the receiver signal 16 has a Doppler shift fd (Hz), and as shown in FIG. 4, the frequency of the receiver signal 16 fluctuates by fd (Hz) as compared with a case where the relative velocity is 0 (m/s). Therefore, in this situation, the beat frequency that is outputted from the mixer 7 is as shown in FIG. 5. Also, the frequency fb (Hz) of the receiver signal that is outputted from the mixer 7 is represented by the following expression.

(EX 2)

$$fb = \frac{4B \cdot R}{Tm \cdot c} + fd \quad (2)$$
$$fd = \frac{2V}{\lambda}$$

where λ (m) is the wavelength of the transmitter signal.

In this case, in actually obtaining the distance R (m) of the target and the relative velocity V (m/s) of the target, the following expression is used with the beat frequency fbu (Hz) by which the frequency is modulated up and the beat frequency fbd (Hz) by which the frequency is modulated down.

(EX 3)

$$R = \frac{Tm \cdot c}{8B}(fbu + fbd) \quad (3)$$
$$V = \frac{\lambda}{4}(fbu - fbd)$$

Figure 6:
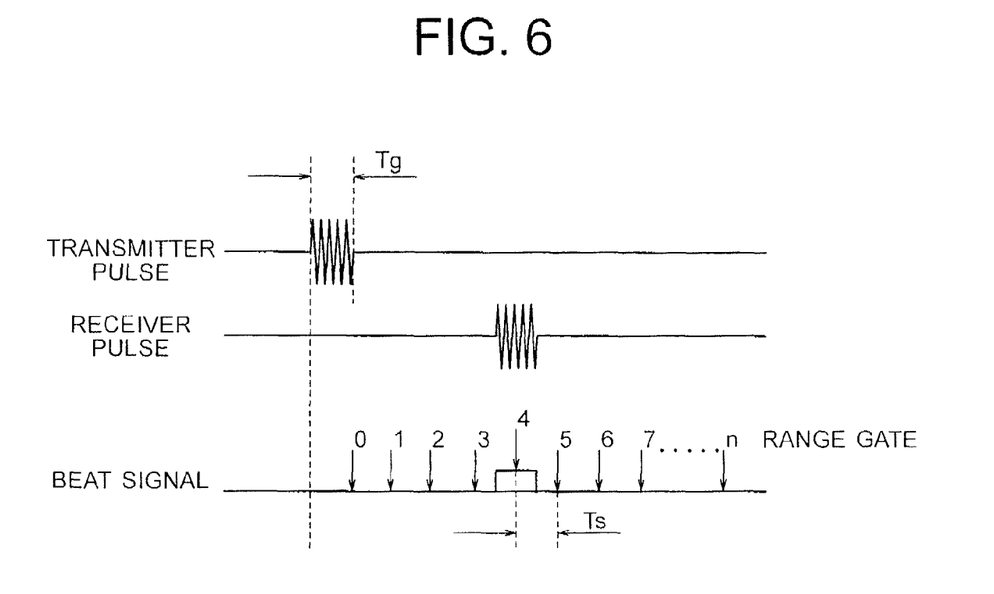
FIG. 6 is an explanatory diagram showing a temporal relationship between a transmitter pulse and a receiver pulse.

In the FM-pulse Doppler radar, the transmitter signal that has been modulated in the frequency is modulated in the pulse, and sampling of n-times is conducted at the sampling interval Ts (m) from the transmission of the pulse signal 15 as shown in FIG. 6. The n sampling points are called "range gate", and the frequency analysis of the digital signal that has been subjected to A/D conversion by the A/D converter 9 is conducted for each of the range gates. For that reason, a distance range Rg (n) (m) which can be measured in each of the range gates is determined according to the pulse width Tg (sec) and the sampling interval Ts (sec), and is represented by the following expression.

(EX 4)

$$\frac{c \cdot Ts \cdot n}{2} \leq Rg(n) \leq \frac{c(Ts \cdot n + Tg)}{2} \quad (4)$$

where n is a range gate No.

In FIG. 6, for example, when the pulse width Tg (sec) is 200 (nsec) and the sampling interval Ts (sec) is 200 (nsec), the reflected signal from the target which appears at the range gate 4 is a signal that is received between (200×4) (nsec) to (200×4+200) (nsec) from the pulse transmission. Therefore, the measurement distance range Rg (4) at the range gate 4 is represented by the following expression.

(EX 5)

$$120\,[m] \leq Rg(4) \leq 150\,[m] \quad (5)$$

That is, only the signal from the target that is located between 120 (m) and 150 (m) is observed at the range gate 4, and the reflected signal from the target which is located outside the above range is not received by the range gate 4.

Also, when the measurable maximum relative velocity Vmax (m/s) of the target is set, the maximum Doppler shift fd_max (Hz) corresponding to the measurable maximum relative velocity is determined. Accordingly, the maxim frequency fd_max (n) (Hz) which is observed by the respective range gates is represented by the following expression through Expressions (2) and (4).

(EX 6)

$$fb\_max(n) = \frac{2B(Ts \cdot n + Tg)}{Tm} + fd\_max \quad (6)$$
$$fd\_max = \frac{2V\max}{\lambda}$$

Also, when the pulse transmission period is set to Tp (sec), the frequency range of the frequency spectrum which is obtained by the frequency analysis is 0 to ½ Tp (sec) on the basis of the sampling theorem.

Figure 7:
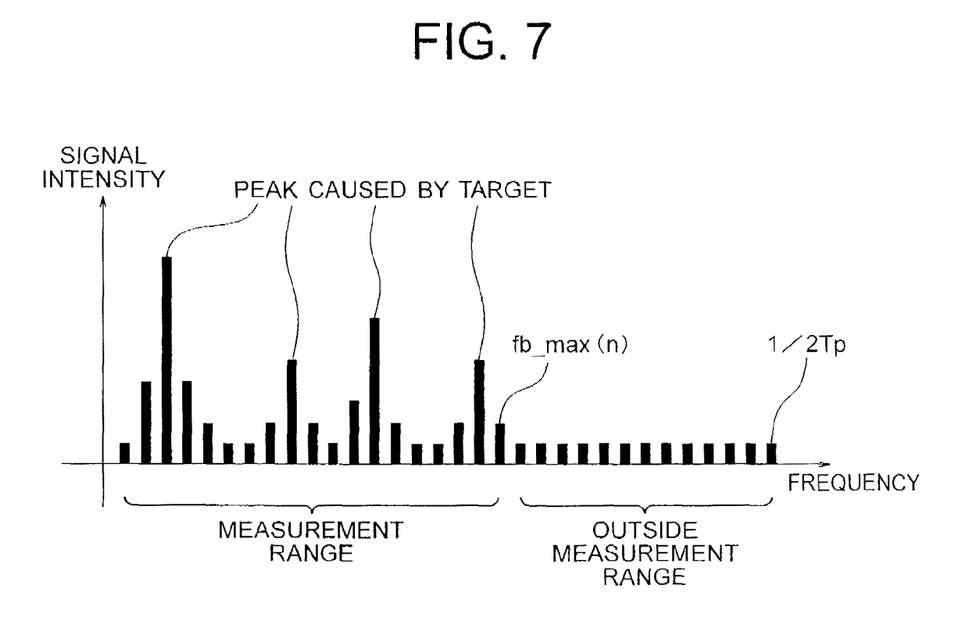
FIG. 7 is a diagram showing a spectrum that is obtained by analyzing the frequency of the beat signal.

Hence, when the pulse transmission period Tp (sec) is determined so that ½ Tp (sec) is larger than fb_max (n) (Hz), an area in which the reflected signal from the target does not appear, that is, an area (outside the measurement range: fb_max to ½ Tp) which is not used for the measurement of the distance to the target and the relative velocity of the target exists in the beat spectrums of the respective range gates, as shown in FIG. 7.

Now, consideration is given to, for example, a case where the pulse width Tg is 200 (nsec), the sampling interval Ts is 200 (nsec), the wavelength of the transmitter signal λ is 4 (mm), the modulation period Tm is 10 (msec), the frequency modulation width B is 50 (MHz), and the measurable maximum relative velocity is ±180 (km/h).

In this situation, the maximum beat frequency fb_max(0) which is observed within the range gate 0 that measures the shortest distance is 2·50·10⁶ (Hz) (200·10⁻⁹ (sec)·0+200·10⁻⁹ (sec))/10·10⁻³ (sec)+2·50 (m/sec)/4·10⁻³ (sec)=2 (kHz)+25 (kHz)=27 (kHz) through Expression (6).

Also, in the case where the pulse transmission period Tp is set to 5 (μsec), the maximum frequency of the spectrum which is obtained by the frequency analysis is ½ Tp (Hz), that is, 100 (kHz). Therefore, the frequency range between 27

(kHz) (not inclusive) and 100 (kHz) (inclusive) is not used for measurement of the distance to the target and the relative velocity of the target at the range gate 0 under the above-mentioned conditions.

That is, in the frequency analysis result that is obtained by a difference between the transmitter signal and the receiver signal, the signal intensity in the frequency range that is not used for the measurement of the distance to the target and the relative velocity of the target does not increase so far as an interference signal from another radar device or a communication device is not received.

Hence, in the frequency analysis result that is obtained by the difference between the transmitter signal and the receiver signal, the interference detecting unit 13 monitors whether the signal intensity in the frequency range that is not used for the measurement of the distance to the target and the relative velocity of the target exceeds a predetermined threshold value or not, thereby making it possible to detect the interference signal from another radar device or the communication device.

Figure 8:
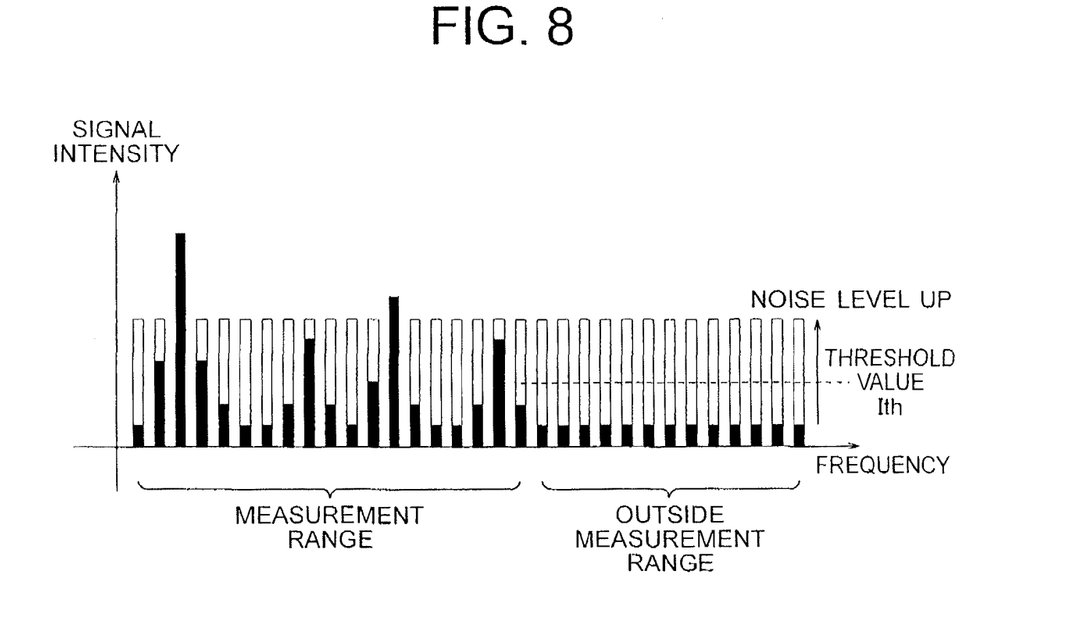
FIG. 8 is a diagram showing a spectrum when an interference occurs.

As shown in FIG. 8, a threshold value Ith for interference detection is set in the interference detecting unit 13 in advance, and the interference detecting unit 13 monitors whether the signal intensity in the frequency range that is not used for measurement of the distance to the target and the relative velocity of the target exceeds the threshold value Ith or not, in all of the range gates. In the case where the signal intensities in all of the range gates which have been monitored exceed the threshold value, if it is determined that the interference occurs, it is possible to conduct the interference detection with a high precision.

Second Embodiment

A second embodiment is identical in the configuration with the first embodiment except that the interference detecting unit 13 monitors whether the signal intensity in the frequency range that is not used for measurement of the distance to the target and the relative velocity of the target exceeds the threshold value or not, in the plurality of range gates that are equal to or more than a given rate, and it is determined that the interference occurs in the case where the signal intensity exceeds the threshold value in the monitored range gates.

According to the second embodiment, since it is determined whether the interference occurs or not, by using not all of the range gates, but the plurality of range gates of the given rate or more, it is possible to determine that the interference occurs with a high precision and at a higher speed than that of the first embodiment.

Third Embodiment

A third embodiment is identical in the configuration with the first embodiment except that the interference detecting unit 13 monitors whether the signal intensity in the frequency range that is not used for measurement of the distance to the target and the relative velocity of the target exceeds the threshold value Ith or not, in a given range gate, and it is determined that the interference occurs in the case where the signal intensity exceeds the threshold value in the monitored range gate.

In the case where the longest distance range gate is used as the given range gate, the maximum frequency $fb\_max(n)$ (Hz) of the beat signal which is used for measurement of the distance to the target and the relative velocity of the target is the largest. Therefore, because the frequency range that is not used for measurement of the distance to the target and the relative velocity of the target is narrow, that is, a range in which the interference is monitored is narrow, the amount of calculation is reduced, thereby making it possible to detect the interference at a higher speed than that in the second embodiment.

According to the third embodiment, since the interference detecting unit 13 determines whether the interference occurs or not, by using not the plurality of range gates, but a single distance range gate, it is possible to determine that the interference occurs at a higher speed than that in the second embodiment. In addition, when the longest distance range gate is used as the given range gate, the amount of calculation is reduced, thereby making it possible to detect the interference at a higher speed.

Fourth Embodiment

A fourth embodiment is identical in the configuration with the third embodiment except that the interference detecting unit 13 uses the shortest distance range gate as the given range gate.

In the case where the longest distance range gate is used as the given range gate, the maximum frequency $fb\_max(n)$ (Hz) of the beat signal which is used for measurement of the distance to the target and the relative velocity of the target is the smallest. Therefore, because the frequency range that is not used for measurement of the distance to the target and the relative velocity of the target is wide, that is, a range in which the interference is monitored is wide, the misjudgment of the interference occurrence due to noises or the like is prevented, thereby making it possible to detect the interference with higher reliability.

According to the fourth embodiment, since it is determined that the interference occurs by using the shortest range gate as the given range gate, it is possible to detect the interference with the higher reliability than that of the third embodiment.

Fifth Embodiment

Figure 9:
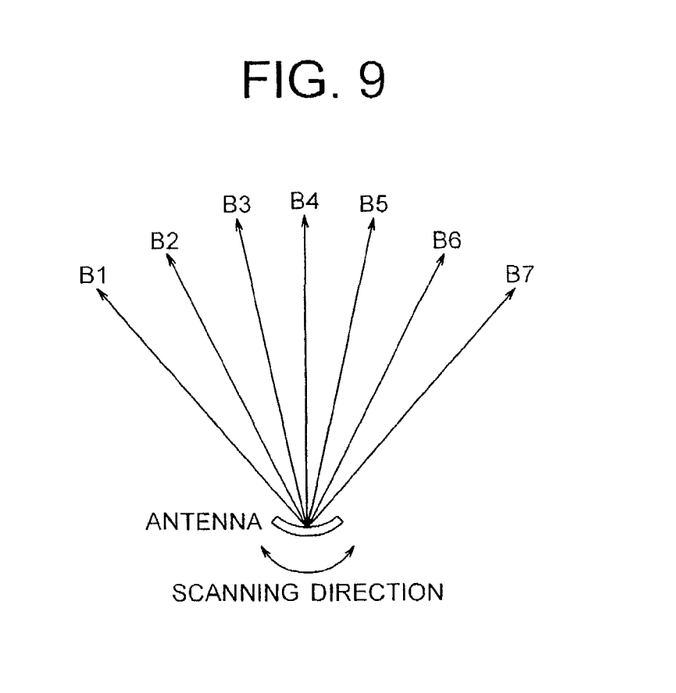
FIG. 9 is an explanatory diagram showing a beam direction at the time of antenna scanning.

A fifth embodiment is identical in the configuration with the first embodiment, but structured in such a manner that antenna scanning is conducted as shown in FIG. 9, and the interference detecting unit 13 determines whether the interference occurs or not for the respective beams B1 to B7 independently.

In the case where the interference detecting unit 13 detects the interference with respect to only the beam 1, the interference detecting unit 13 does not measure the distance and the relative velocity from the frequency analysis result in the beam 1, but notifies the occurrence of the interference. Also, the interference detecting unit 13 measures the distance and the relative velocity from the frequency analysis result with respect to other beams.

In other words, the interference detecting unit 13 monitors whether the signal intensity in the frequency range which is not used for measurement of the distance to the object and the relative velocity of the object in all of beam directions exceeds the threshold value Ith or not, at the time of antenna scanning, and in the case where the interference detecting unit 13 detects the interference signal that exceeds the threshold value Ith from another radar device or a communication device in a given beam direction, the interference detecting unit 13 does not measure the distance to the object and the relative velocity of the object in the beam direction.

According to the fifth embodiment, since it is determined whether the interference occurs or not, for each of the beams, even if the interference occurs in a certain beam, the frequency analysis result of the beam in which interference is not detected can be used for measurement of the distance to the target and the relative velocity of the target. Therefore, even if the interference occurs, an influence of the interference on the measurement can be suppressed to the minimum.

Sixth Embodiment

A sixth embodiment is identical in the configuration with the fifth embodiment except that the past measured values of the distance and the relative velocity of the respective beams are recorded in advance, and the past measured values of the distance and the relative velocity which have been recorded are used instead of the current measured values in the beam in which the interference occurs.

In other words, the interference detecting unit 13 monitors whether the signal intensity in the frequency range which is not used for measurement of the distance to the object and the relative velocity of the object in all beam directions exceeds the threshold value Ith or not, at the time of antenna scanning, and in the case where the interference detecting unit 13 detects the interference signal that exceeds the threshold value Ith from another radar device or a communication device in a given beam direction, the interference detecting unit 13 uses the past measured values of the distance and the relative velocity in the measurement of the distance to the object and the relative velocity of the object in the beam direction.

According to the sixth embodiment, since the interference detecting unit 13 uses the past measured values of the distance and the relative velocity as the measured values of the distance and the relative velocity of the beam in which the interference occurs, even if the interference occurs, it is possible to measure the distance of the target and the relative velocity of the target in all of the beams without any deficiency.

Seventh Embodiment

A seventh embodiment is identical in the configuration with the fifth embodiment except that the interference detecting unit 13 sets a new threshold value on the basis of the signal intensity of the frequency range that is not used for measurement of the distance and the relative velocity in the beam in which the interference occurs, and measures the distance to the target and the relative velocity of the target with respect to the spectrum that is equal to or higher than the threshold value.

In other words, the interference detecting unit 13 monitors whether the signal intensity in the frequency range which is not used for measurement of the distance to the object and the relative velocity of the object in all beam directions exceeds the threshold value or not, at the time of antenna scanning, and in the case where the interference detecting unit 13 detects the interference signal that exceeds the threshold value from another radar device or a communication device in a given beam direction, the interference detecting unit 13 measures the distance to the object and the relative velocity of the object in the beam direction with respect to only the spectrum that exceeds the threshold value.

According to the seventh embodiment, the interference detecting unit 13 detects the target by using the newly set threshold value on the basis of the signal intensity of the frequency range which is not used for measurement of the distance and the relative velocity in the beam in which the interference occurs. As a result, it is possible to measure the distance and the relative velocity with respect to the shorter distance target that is relatively high in the receiving intensity regardless of the presence or absence of the interference occurrence.

What is claimed is:

1. A radar device, which is mounted on a vehicle for detecting an object, comprising:
   transmitting means for transmitting an electromagnetic wave as a transmitter signal;
   receiving means for receiving a reflected signal that is reflected from the object as a receiver signal;
   signal processing means for measuring a distance and a relative velocity between the vehicle and the object on the basis of a beat signal that is obtained from the transmitter signal and the receiver signal, and recording the measured distance and relative velocity as past measured values; and
   interference detecting means for dividing frequencies that are obtained by frequency analysis by the signal processing means into a measurement frequency range that is used for measuring the distance to the object and the relative velocity of the object, and an outside frequency range that is not used for measuring the distance to the object and the relative velocity of the object, to detect an interference signal from one of another radar device and a communication device on the basis of a signal intensity within the outside frequency range;
   wherein the radar device is an FM-pulse Doppler radar system, and
   wherein the interference detecting means sets a threshold value based on the signal intensity of the outside frequency range, and monitors whether the signal intensity within the outside frequency range in all beam directions at a time of antenna scanning exceeds the threshold value or not, and measures the distance to the object and the relative velocity of the object in the beam directions with respect to only the spectrum that exceeds the threshold value when detecting the interference signal that exceeds the threshold value from the another radar device and the communication device in a given beam direction.

* * * * *